(12) United States Patent
Piantoni

(10) Patent No.: US 11,773,947 B2
(45) Date of Patent: Oct. 3, 2023

(54) APPARATUS FOR PRESSING A TOOTHED RACK AGAINST A PINION

(71) Applicant: ZF Automotive Italia S.r.l., Turin (IT)

(72) Inventor: Angelo Piantoni, Brescia (IT)

(73) Assignee: ZF Automotive Italia S.r.l., Brescia (IT)

( * ) Notice: Subject to any disclaimer, the term of this patent is extended or adjusted under 35 U.S.C. 154(b) by 0 days.

(21) Appl. No.: 17/962,625

(22) Filed: Oct. 10, 2022

(65) Prior Publication Data

US 2023/0115582 A1 Apr. 13, 2023

(30) Foreign Application Priority Data

Oct. 11, 2021 (DE) .......................... 102021211445.8

(51) Int. Cl.
*F16H 19/04* (2006.01)

(52) U.S. Cl.
CPC ....... *F16H 19/04* (2013.01); *F16H 2019/046* (2013.01)

(58) Field of Classification Search
CPC .. F16H 19/04; F16H 55/283; F16H 2019/046; F16H 2055/281; F16H 57/12; B62D 3/126; B62D 3/12; B62D 3/123; B62D 3/02; Y10T 74/1967; Y10T 74/19623; Y10T 74/18096
See application file for complete search history.

(56) References Cited

U.S. PATENT DOCUMENTS

| 6,178,843 | B1 * | 1/2001 | Machida ............... | F16H 55/283 384/291 |
| 8,256,315 | B2 * | 9/2012 | Song .................... | F16H 55/283 280/93.514 |
| 8,794,093 | B2 * | 8/2014 | Bareis .................. | F16H 55/283 74/440 |
| 9,296,412 | B2 * | 3/2016 | Witting ................. | B62D 3/123 |

(Continued)

FOREIGN PATENT DOCUMENTS

| DE | 102009046304 A1 * | 5/2011 | ............ B62D 3/123 |
| DE | 102010029603 A1 | 12/2011 | |

(Continued)

*Primary Examiner* — Victor L MacArthur
(74) *Attorney, Agent, or Firm* — Kristin L. Murphy

(57) ABSTRACT

The disclosure relates to an apparatus for pressing a toothed rack against a pinion, having a pressure piece. The pressure piece can be arranged so as to be displaceable inside a housing and in an axial direction of a centre longitudinal axis. A bearing element that can be fixed on the housing in an axial direction with respect to the centre longitudinal axis, having a prestressing element that acts in an axial direction. Action of the prestressing element arranged between the bearing element and the pressure piece subjected the pressure piece to a prestressing force in an axial direction with respect to the centre longitudinal axis and directed away from the bearing element. A sliding element is arranged on a side, facing away from the prestressing element, of the pressure piece for the purpose of bearing against the toothed rack. In order to reduce the production outlay and/or allow a more compact design, on the side bearing against the sliding element, the pressure piece has a contour for compensating tolerances. The contour interacts with the sliding element.

17 Claims, 8 Drawing Sheets

(56) References Cited

U.S. PATENT DOCUMENTS

| | | | |
|---|---|---|---|
| 2010/0024583 A1 | 2/2010 | Kawakubo et al. | |
| 2013/0247696 A1 | 9/2013 | Imamura | |
| 2015/0291205 A1 | 10/2015 | Nishitani et al. | |
| 2023/0111260 A1* | 4/2023 | Piantoni | F16H 19/04 74/422 |
| 2023/0115582 A1* | 4/2023 | Piantoni | F16H 19/04 74/422 |

FOREIGN PATENT DOCUMENTS

| | | | |
|---|---|---|---|
| DE | 102012012303 A1 | 1/2013 | |
| KR | 20120140304 A * | 12/2012 | F16H 19/04 |

* cited by examiner ates a pparatus for pressing a toothed rack against a pinion

CROSS-REFERENCE TO RELATED APPLICATION

This application claims priority to German Priority Application No. 102021211445.8, filed Oct. 11, 2021, the disclosure of which is incorporated herein by reference in its entirety.

TECHNICAL FIELD

The disclosure relates to an apparatus for pressing a toothed rack against a pinion, having a pressure piece, wherein the pressure piece can be arranged so as to be displaceable inside a housing and in an axial direction of a centre longitudinal axis, having a bearing element that can be fixed on the housing in an axial direction with respect to the centre longitudinal axis, having a prestressing element that acts in an axial direction, wherein, by action of the prestressing element arranged between the bearing element and the pressure piece, the pressure piece is subjected to a prestressing force in an axial direction with respect to the centre longitudinal axis and directed away from the bearing element, and having a sliding element, wherein the sliding element is arranged on a side, facing away from the prestressing element, of the pressure piece for the purpose of bearing against the toothed rack.

BACKGROUND

An apparatus of this type is generally known from DE 10 2010 029 603 A1. Such an apparatus includes multiple individual parts or elements that can be preassembled using a damping pin to form an assembly unit. This assembly unit can then be mounted in the housing. The housing may be in the form of an independent element or an integral or one-piece constituent part of a gear housing, for example, a steering gear housing. In order to compensate tolerances, for example to compensate play and/or wear, the known apparatus has two adjusting discs that can be rotated relative to one another and a spring disc in the form of singles element or components. The multiplicity of individual elements for forming the apparatus can lead to an increased production outlay.

SUMMARY

What is needed is to further develop an apparatus of the type mentioned above in such a way that the production outlay can be reduced and/or a more compact design can be realized. More specifically, the intention is to provide an alternative embodiment.

The disclosure relates to an apparatus for pressing a toothed rack against a pinion. In one exemplary arrangement, the apparatus is designed for use in a steering gear and/or a steering mechanism. The apparatus may be in the form of a steering gear or a steering mechanism. The steering gear and/or the steering mechanism may be designed for use in a vehicle or be arranged in a vehicle. In one exemplary arrangement, the apparatus and/or the steering gear and/or the steering mechanism comprise(s) the toothed rack and the pinion. The pinion may be in the form of a pinion gearwheel or a pinion shaft, such as a worm shaft.

In one exemplary arrangement, the pinion is in engagement with a gearwheel or worm gear that can be driven by a motor.

The apparatus has a pressure piece, wherein the pressure piece can be arranged or is arranged so as to be displaceable inside a housing in an axial direction of a centre longitudinal axis. In one exemplary arrangement, the apparatus comprises the housing. The housing has or forms the housing interior space. The housing interior space may be realized as a recess and/or bore. In particular, the housing interior space has a hollow-cylindrical form. The pressure piece may be guided so as to be displaceable inside the housing in an axial direction of the centre longitudinal axis. The housing interior space and/or the pressure piece may have or define the centre longitudinal axis. The centre longitudinal axis may thus be in the form of the centre longitudinal axis of the housing interior space and/or in the form of the centre longitudinal axis of the pressure piece. The centre longitudinal axis of the housing interior space can coincide with the centre longitudinal axis of the pressure piece. In one exemplary arrangement, the pressure piece is guided displaceably in an axial direction of the centre longitudinal axis of the pressure piece, for example along a clamping pin.

The apparatus has a bearing element. The bearing element can be fixed or is fixed on the housing in an axial direction with respect to the centre longitudinal axis. The bearing element may be in the form of a covering and/or in the form of a cover for the housing interior space and/or designed for closing the housing interior space. The bearing element may have a screw thread, for example an external thread, for screwing and/or fixing in an opening of the housing interior space. To this end, the opening and/or the housing interior space may have an internal thread of corresponding form to the external thread.

Furthermore, the apparatus has a prestressing element which acts in an axial direction. The prestressing element may be in the form of a spring, such as a compression spring and/or helical spring. The prestressing element, which is arranged between the bearing element and the pressure piece, subjects the pressure piece to a prestressing force in an axial direction with respect to the centre longitudinal axis. In one exemplary arrangement, the prestressing force is in the direction of the housing interior space and/or of the pressure piece, and directed away from the bearing element. As a result, the toothed rack can be presses against the pinion by the pressure piece.

The apparatus has a sliding element. In this respect, the sliding element is arranged on a side, facing away from the prestressing element, of the pressure piece for the purpose of bearing against the toothed rack. During operation, the toothed rack can be displaced by the pinion in a longitudinal direction of the toothed rack in order to steer wheels. In this respect, the toothed rack slides along the sliding element and is at the same time pressed against the pinion. For example, the sliding element makes it possible to slide the toothed rack along the sliding element with as little friction and/or wear as possible. The sliding element may have a circular arc segment-like or substantially circular arc segment-like cross section. This cross section, which may be shell-like, is designed to bear against the toothed rack.

On the side bearing against the sliding element, the pressure piece has a contour for compensating tolerances, wherein the contour interacts with the sliding element.

In this respect, it is advantageous for the pressure piece according to the disclosure to perform a dual function. Firstly, the pressure piece is designed to press the toothed rack against the pinion. Secondly, it is possible to realize tolerance compensation in an axial direction of the centre longitudinal axis by a contour in the side, bearing against the sliding element, of the pressure piece. This makes it possible to at least partially compensate tolerances, for example a play and/or wear, by the contour of the pressure piece in interaction with the sliding element. For example, this makes it possible to dispense with a spring washer as an additional and independent component, since its function is taken on by the contour of the pressure piece in interaction with the sliding element. In this way, fewer individual parts are required to produce the apparatus, as a result of which the production outlay can be reduced and/or more compact designs can be realized. On and/or in the side, bearing against the sliding element, of the pressure piece, the pressure piece may have at least one contour portion or multiple contour portions for the purpose of forming the contour.

According to a further exemplary arrangement, owing to the contour, the sliding element is elastically deformed in an axial direction of the centre longitudinal axis, such as the housing interior space and/or of the pressure piece, in a mounted state, for example a state mounted on the toothed rack. In particular owing to the contour, the sliding element is under a prestress in an axial direction of the centre longitudinal axis, for example of the housing interior space and/or of the pressure piece, in a mounted state.

In one exemplary arrangement, in the mounted state, the contour is at least partially or completely filled with at least one portion, that is elastically deformed into the contour, of the sliding element. It is thus possible, in the mounted state, for at least one portion of the sliding element to be elastically pressed into the contour. In one exemplary arrangement, two portions of the sliding element are elastically pressed into two contour portions of the contour.

According to one exemplary refinement, the contour is formed by at least one depression in that side of the pressure piece that bears against the sliding element. In this respect, the at least one depression may be in the form of a groove. A depression of this type can be formed easily already during the production of the pressure piece, for example as a shaped and/or cast part. As an alternative, such a depression can be formed on the pressure piece by machining. The at least one depression extends parallel to the longitudinal axis of the toothed rack and/or to a centre longitudinal axis of the toothed rack.

According to a further exemplary arrangement, the contour has multiple depressions or two depressions. The multiple depressions or the two depressions may extend parallel to one another and in an axial direction of the toothed rack. The multiple depressions and/or the two depressions may be arranged or formed mirror-symmetrically with respect to the centre longitudinal axis of the pressure piece. A respective depression is arranged in a first angle range of +25° to +50° and in a second angle range of −25° to −50° with respect to the centre longitudinal axis and proceeding from a centre point of the toothed rack. Consequently, a first depression may be arranged or formed in the first angle range and a second depression may be arranged or formed in the second angle range. For example, the centre point of the toothed rack lies on a centre longitudinal axis of the toothed rack.

According to one exemplary refinement, the depression has a continuously changing depth between two edge regions of the depression. A width of the depression is specified or defined by the distance between the two edge regions. For example, the depression has a first depth in the region of a first edge region and a second depth in the region of a second edge region, wherein the depth continuously decreases from the first edge region to the second edge region. The depth may be produced radially with respect to a centre point or a centre longitudinal axis of the toothed rack and proceeding from that side of the pressure piece that bears against the sliding element and in which the depression is made. The depression preferably has a maximum depth of less than 1 mm or less than 0.5 mm or less than 0.2 mm.

According to a further exemplary arrangement, the sliding element has a multi-layered, and in one exemplary arrangement, a 3-layered, form. In this respect, multiple material layers of the sliding element are arranged one on top of another radially with respect to the longitudinal axis of the toothed rack and/or with respect to the centre longitudinal axis of the toothed rack. The sliding element may be made from spring steel or the sliding element comprises spring steel, as a first material layer. The use of spring steel makes it possible to easily and cost-effectively realize the spring function of the sliding element.

In particular, a material layer facing the pressure piece is made from spring steel. The spring steel can thus be supported on the pressure piece and/or elastically deform into the contour of the pressure piece. A material layer facing the toothed rack may be made from a plastic. The plastic may be made from an especially low-friction material, for example PTFE. A bronze material layer may be arranged between the spring steel material layer and the plastic material layer.

According to a further exemplary arrangement, the apparatus has an adjusting device. The adjusting device has an adjusting disc which is arranged between the bearing element and the pressure piece. In this respect, the adjusting disc is prestressed and/or rotatably mounted about the centre longitudinal axis by a torsion spring. The adjusting disc has a first bearing face with at least one inclined face, which bears against a second bearing face with at least one inclined face, wherein the second bearing face is in the form of a one-piece constituent part of the pressure piece or of the bearing element. Consequently, by contrast to known solutions, the use of a second adjusting disc as a separate component can be dispensed with. Instead, according to this exemplary arrangement, just a single adjusting disc is used. Since the second bearing face is in the form of a one-piece constituent part of the pressure piece or of the bearing element, the number of individual components for forming the apparatus can be reduced further. The production outlay for mounting the apparatus is reduced. Furthermore, this enables a yet more compact design.

In one exemplary arrangement, the pressure piece has the second bearing face on a side facing away from the toothed rack. In this respect, a side, facing away from the second bearing face, of the adjusting disc bears against the bearing element. The adjusting disc is thus supported on the bearing element in an axial direction.

As an alternative, the bearing element has the second bearing face on a side facing the pressure piece. In this respect, a side, facing away from the bearing element, of the adjusting disc bears against the pressure piece. The adjusting disc is thus supported on the pressure piece in an axial direction here.

BRIEF DESCRIPTION OF DRAWINGS

The disclosure will be explained in more detail below with reference to the figures. In this respect, the same reference signs relate to components or elements that are the same, similar or have the same function. In the figures.

DETAILED DESCRIPTION

Figure 1:
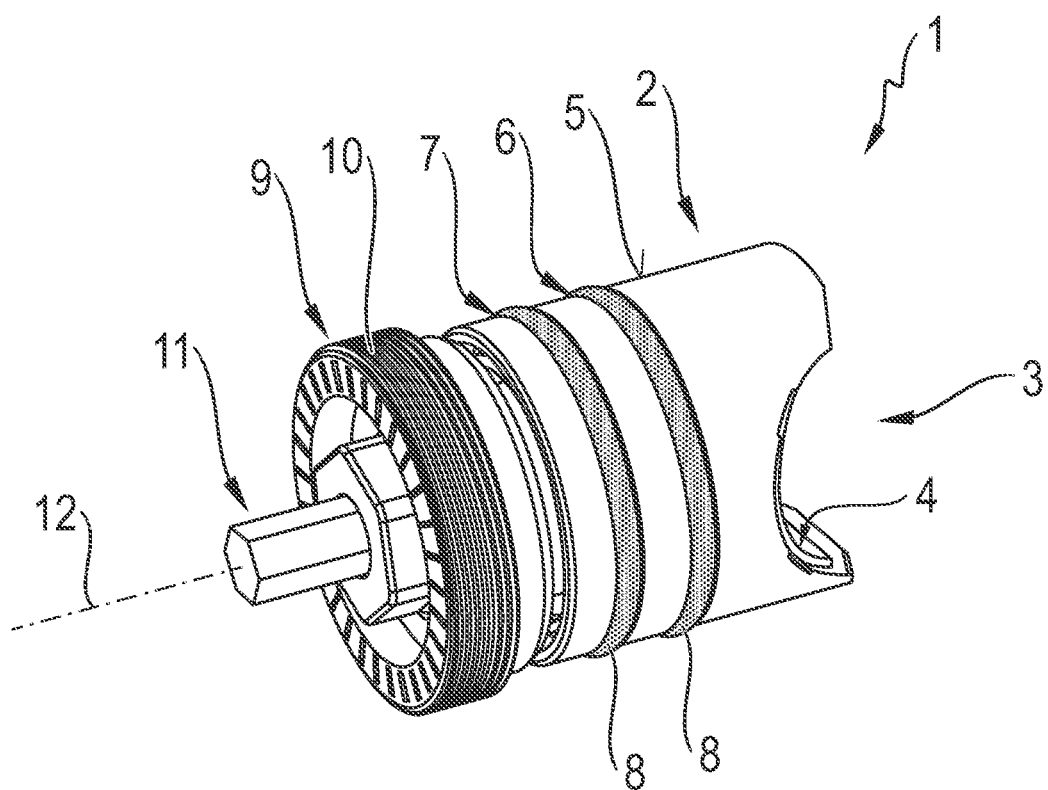
FIG. 1 shows a perspective side view of an apparatus according to the disclosure.

FIG. 1 shows a perspective side view of an apparatus 1 according to the disclosure. The apparatus 1 is designed to press a toothed rack, which is not illustrated in more detail here, against a pinion. For this purpose, the apparatus 1 has a pressure piece 2. The pressure piece 2 has a recess 3 for partially receiving the toothed rack. A sliding element 4 is arranged in the recess 3.

In this exemplary arrangement, the pressure piece 2 has a cylindrical outer face 5, two encircling grooves 6, 7 being formed in the outer face 5. A respective seal 8 is arranged in the grooves 6, 7. In this exemplary arrangement, each seal 8 is in the form of an O ring.

The apparatus 1 furthermore has a bearing element 9. The bearing element 9 is arranged on a side facing away from the recess 3. The bearing element 9 has a screw thread 10, which is realized as an external thread here.

In this exemplary arrangement, the apparatus 1 has a clamping pin 11. The damping pin 11 extends through the bearing element 9 into the pressure piece 2. The apparatus 1 is preassembled as an assembly unit by the clamping pin 11. This assembly unit may then be mounted or screwed in a housing, which is not illustrated in more detail here. The apparatus 1 has a centre longitudinal axis 12. The centre longitudinal axis 12 may also be considered the centre longitudinal axis 12 of the pressure piece 2.

Figure 2:
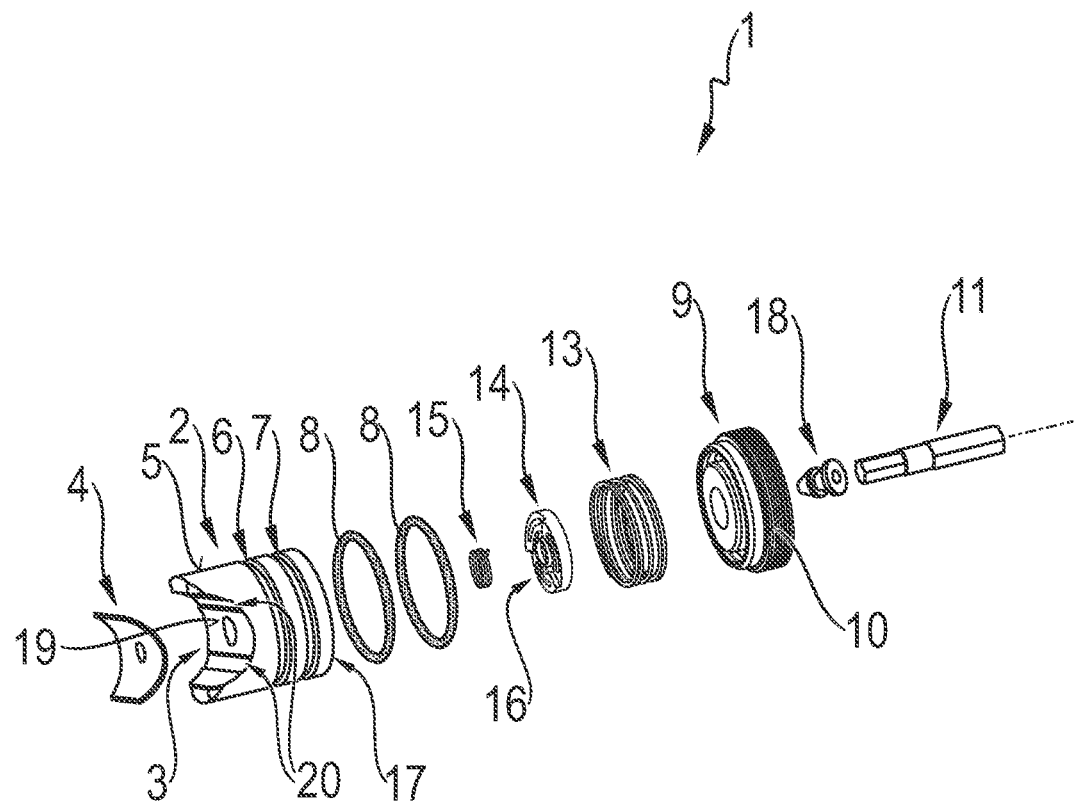
FIG. 2 shows an exploded illustration of the individual parts of the apparatus according to the disclosure as per FIG. 1.

FIG. 2 shows an exploded illustration of the individual parts of the apparatus 1 according to the disclosure as per FIG. 1. It can be seen that the apparatus 1 has a prestressing element 13. In this exemplary arrangement, the prestressing element 13 is in the form of a compression spring or helical spring. In the mounted state as per FIG. 1, the prestressing element 13 is arranged between the bearing element 9 and the pressure piece 2.

Furthermore, the apparatus 1 has an adjusting disc 14 and a torsion spring 15. The adjusting disc 14 has a first bearing face 16. The first bearing face 16 faces a second bearing face 17, which cannot be seen in more detail here, and interacts with it in the mounted state as per FIG. 1. In this exemplary arrangement, the second bearing face 17 is in the form of a one-piece constituent part of the pressure piece 2.

In this exemplary arrangement, the apparatus 1 has an insert 18. In the mounted state as per FIG. 1, the insert 18 can be arranged on the bearing element 9, the clamping pin 11 being guided through the insert 18. As an alternative, the insert 18 may be or have been inserted into the bearing element 9, for example to close an opening in the bearing element 9 through which the clamping pin 11 was passed previously, after the mounting and after removing the clamping pin 11.

In the mounted or preassembled state, on a side 19, bearing against the sliding element 4, of the pressure piece 2, the pressure piece 2 as per FIG. 1 has a contour 20 for compensating tolerances. The concavely inwardly curved side 19 of the pressure piece 2 is formed by the recess 3. In other words, the side 19 has a substantially cylinder segment-like form. In the mounted or preassembled state as per FIG. 1, the contour 20 interacts with the sliding element 4, as will be explained in more detail below.

Figure 3:
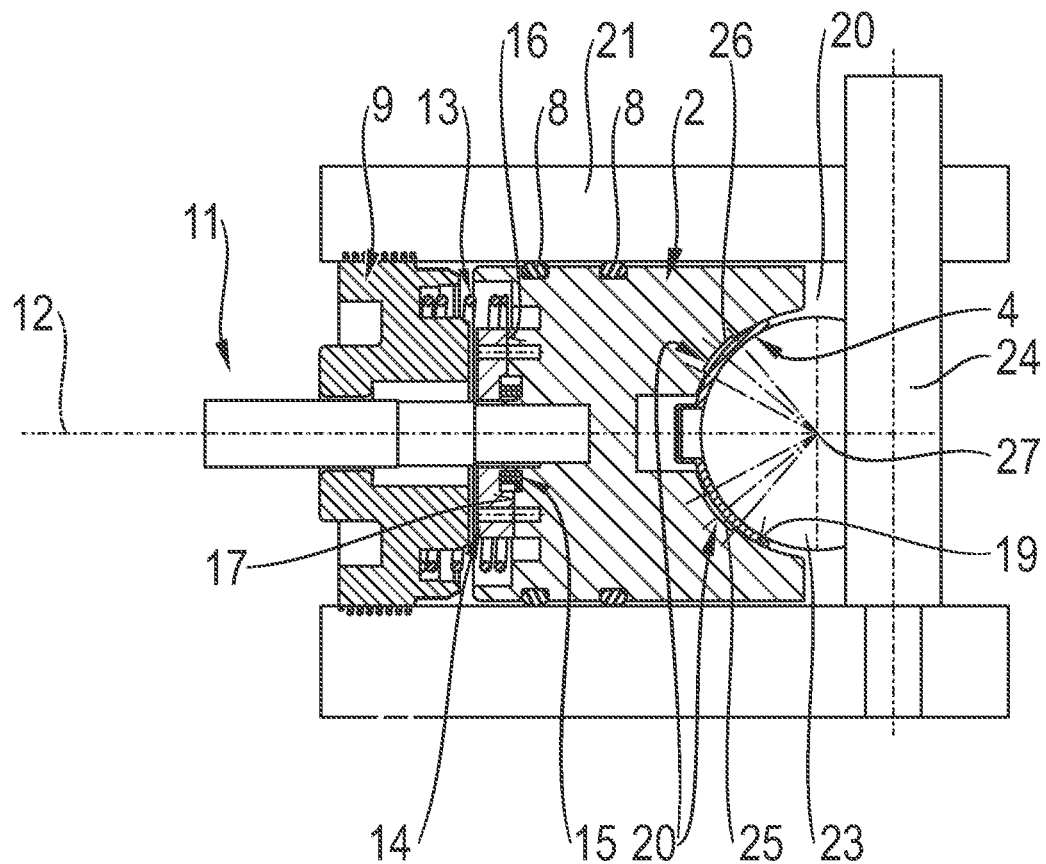
FIG. 3 shows a sectional side view of the apparatus according to the disclosure as per FIG. 1.

FIG. 3 shows a sectional side view of the apparatus according to the disclosure as per FIG. 1. In this respect, the apparatus 1 is arranged in a housing 21. In this exemplary arrangement, the housing 21 is a constituent part of a steering gear or a steering mechanism. The housing 21 may be a constituent part of the apparatus 1. The housing 21 has a housing interior space 22. In this exemplary arrangement, the housing interior space 22 has a hollow-cylindrical form. The bearing element 9 is fixed on the housing 21 and inside the housing interior space 22 in an axial direction with respect to the centre longitudinal axis 12. In this respect, the centre longitudinal axis 12 can also be considered a centre longitudinal axis 12 of the housing interior space 22. In this exemplary arrangement, the bearing element 9 forms a type of covering, cover or closure for the housing interior space 22.

The pressure piece 2 is arranged or guided so as to be displaceable inside the housing 21 in an axial direction of the centre longitudinal axis 12 of the housing interior space 22 or of the pressure piece 2. The prestressing element 13 is prestressed in an axial direction of the centre longitudinal axis 12. In this respect, by means of the prestressing element 13 arranged between the bearing element 9 and the pressure piece 2, the pressure piece 2 is subjected to a prestressing force in an axial direction with respect to the centre longitudinal axis 12 and directed away from the bearing element 9. The pressure piece 2 and the sliding element 4 arranged between the pressure piece 2 and a toothed rack 23 are thus pressed against the toothed rack 23. As a result, at the same time the toothed rack 23 is pressed against a pinion 24. The toothed rack 23 and the pinion 24 are illustrated only schematically here. The toothed rack 23 and the pinion 24 may be constituent parts of the apparatus 1. In this exemplary arrangement, the pinion 24 is realized as a pinion shaft. The pinion 24 may be in engagement with a gearwheel or worm gear, not illustrated in more detail here, such a gearwheel or worm gear being able to be driven or being driven by a motor. Consequently, the toothed rack 23 can be moved in a longitudinal direction of the toothed rack 23 by the driven pinion 24.

In this exemplary arrangement, a side, facing away from the second bearing face 17, of the adjusting disc 14 bears against the bearing element 9. The torsion spring 15 is arranged between the adjusting disc 14 and the pressure piece 2. The adjusting disc 14 is prestressed in a direction about the centre longitudinal axis 12 by the torsion spring 15. A rotation of the adjusting disc 14 owing to the torsion spring 15 and the interaction of the two bearing faces 16, 17 allows the pressure piece 2 to be adjusted or wear and/or tolerances to be compensated. As a result, an adjusting device is realized.

In this exemplary arrangement, the contour 20 is formed by multiple depressions, specifically two depressions 25, 26, in the side 19 of the pressure piece 2.

The two depressions 25, 26 in the form of grooves extent parallel to one another and in an axial direction of the toothed rack 23. In this respect, the two depressions 25, 26 have a mirror-symmetrical form with respect to the centre longitudinal axis 12 of the pressure piece 2. In this exemplary arrangement, a first depression is arranged in a first angle range of +25° to +50° and the second depression 26 is arranged in a second angle range of −25° to −50° with respect to the centre longitudinal axis 12 and proceeding from a centre point 27 of the toothed rack 23.

Figure 4:
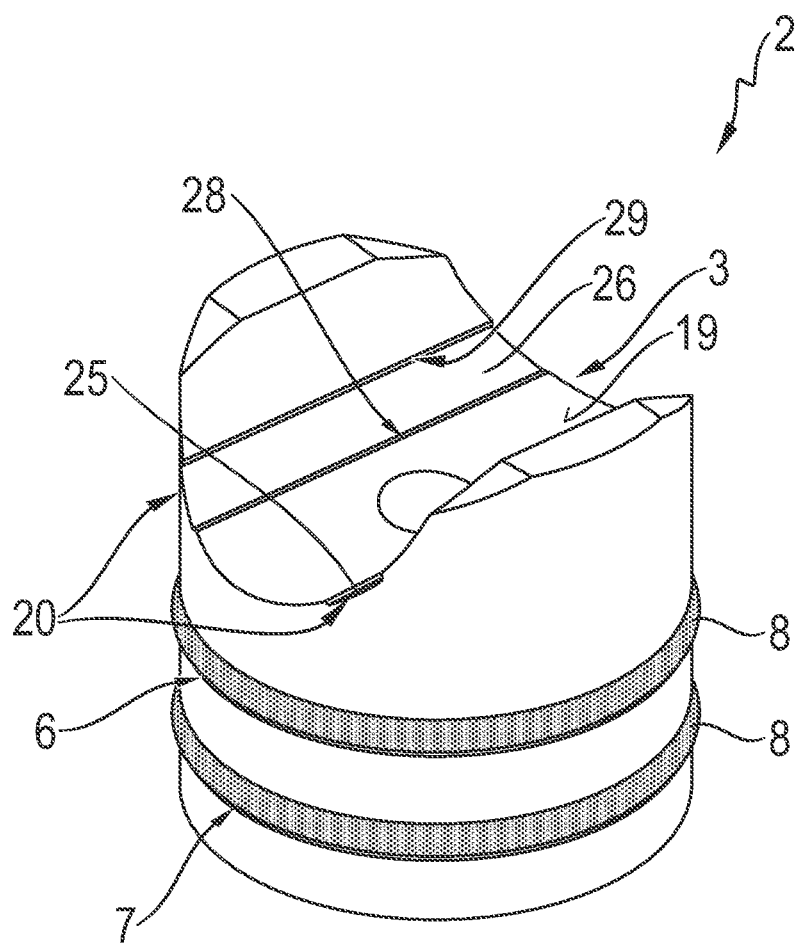
FIG. 4 shows a perspective side view of a pressure piece in an unmounted state for the apparatus according to the disclosure as per FIG. 1.

FIG. 4 shows a perspective side view of the pressure piece 2 in an unmounted state for the apparatus 1 according to the disclosure as per FIG. 1. In this exemplary arrangement, the depressions 25, 26 are each in the form of a groove in the side 19 of the pressure piece 2. Groove-like depressions 25, 26 of this type can be formed easily already during the production of the pressure piece 2, in particular as a shaped and/or cast part. As an alternative, such depressions 25, 26 may be formed on the pressure piece 2 or in the side 19 by machining. The groove-shaped depressions 25, 26 each have two spaced-apart edge regions 28, 29 running parallel to one another. Here, to provide better clarity, only the edge regions 28, 29 of the depression 26 are provided with reference signs. In the mounted or preassembled state as per FIG. 3, the groove-shaped depressions 25, 26 extend parallel to the longitudinal axis of the toothed rack 23.

Figure 5:
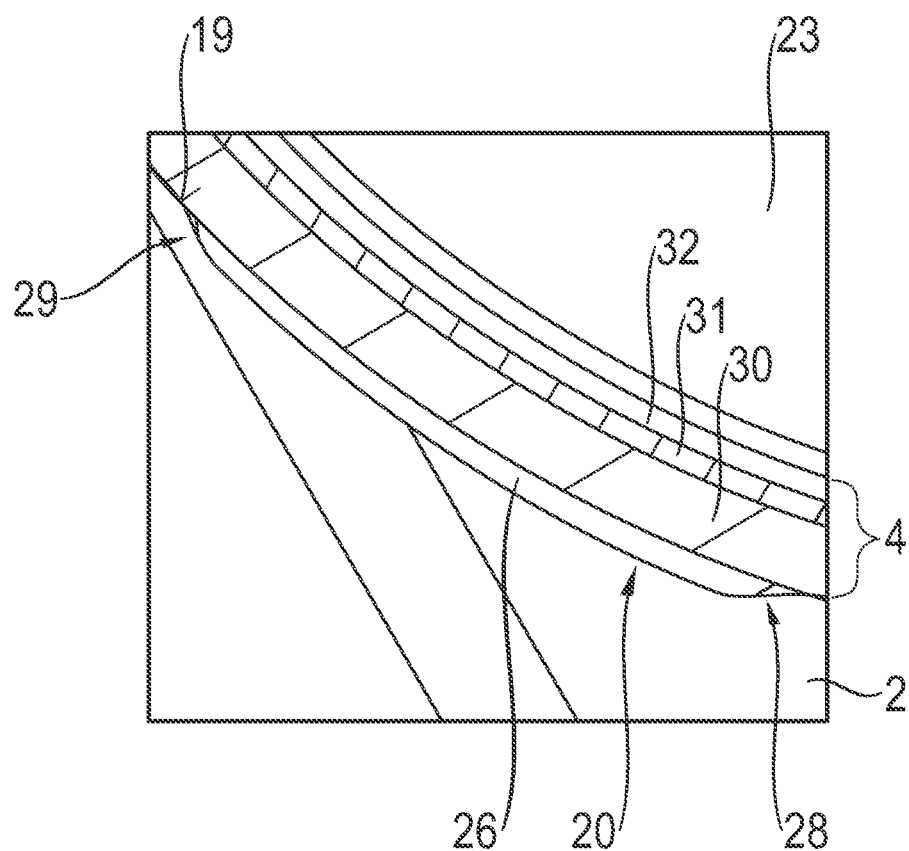
FIG. 5 shows a detail of the sectional side view of the bearing according to the disclosure as per FIG. 3.

FIG. 5 shows a detail of the sectional side view of the bearing 1 according to the disclosure as per FIG. 3. In this respect, the depression 26 can be seen in cross section, the following statements likewise holding true for the depression 25.

The depression 26 has a continuously changing depth between the two edge regions 28, 29 of the depression 26. Owing to the distance between the two edge regions 28, 29, a width of the depression 26 is specified or defined. In this exemplary arrangement, the depression 26 has a first maximum edge-region-side depth in the region of the first edge region 28 and a second maximum edge-region-side depth in the region of the second edge region 29, the depth continuously decreasing from the first maximum edge-region-side depth of the first edge region 28 to the second maximum edge-region-side depth of the second edge region 29. In this respect, the depth or the dimension of the depth is produced radially with respect to the centre point 27 of the toothed rack 23 as per FIG. 3 and proceeding from that side 19 of the pressure piece 2 that bears against the sliding element 4 and in which the depression 26 is made. In this exemplary arrangement, the depression 26 has a maximum depth in the region of the first edge region 28 of less than 0.5 mm.

Furthermore, it is schematically illustrated here that the sliding element 4 has a multi-layered, specifically in the exemplary arrangement 3-layered, form. In this respect, a first material layer 30 is made from a spring steel in this exemplary arrangement. The first material layer 30 bears against the pressure piece 2 or the side 19 of the pressure piece 2. A second material layer 31, which at the same time forms an intermediate layer, is made from bronze in this exemplary arrangement. In this exemplary arrangement, a third material layer 32 is made from a low-friction plastic. In the mounted state, the third material layer 32 bears against the toothed rack 23. The second material layer 31 is thus arranged between the first material layer 30 and the third material layer 32. Providing the spring steel material layer 30 makes it possible easily and cost-effectively for web-like portions of the sliding element 4 to elastically deform into the groove-like depressions 25, 26.

The sliding element 4 or at least portions of the sliding element 4 can thus be elastically deformed in an axial direction of the centre longitudinal axis 12 of the pressure piece 2 owing to the contour 20.

Figure 6:
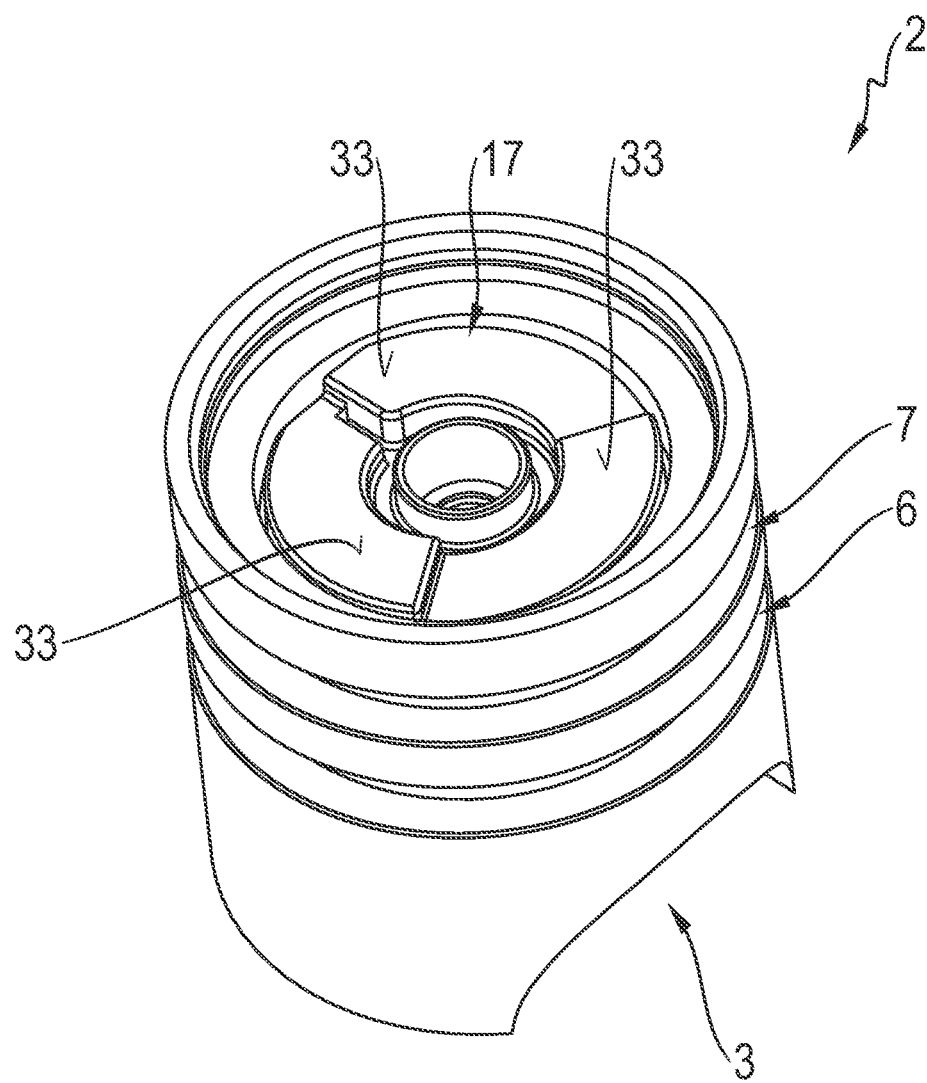
FIG. 6 shows a further perspective side view of the pressure piece for the apparatus according to the disclosure as per FIG. 1.

FIG. 6 shows a perspective side view of the pressure piece 2 for the apparatus 1 according to the disclosure as per FIG. 1. It can be clearly seen that, in this exemplary arrangement, the pressure piece 2 has the second bearing face 17, which is formed in one piece with the pressure piece 2. The second bearing face 17 has multiple inclined faces 33. In this exemplary arrangement, the second bearing face 17 overall has three inclined faces 33. As an alternative, it is possible to realize only two inclined faces 33 or more than three inclined faces 33. The inclined faces 33 each have a circular arc segment-like form. In this respect, all of the inclined faces 33 have a respective identical slope in the same direction of rotation about the centre longitudinal axis 12, which is not illustrated in more detail here.

Figure 7:
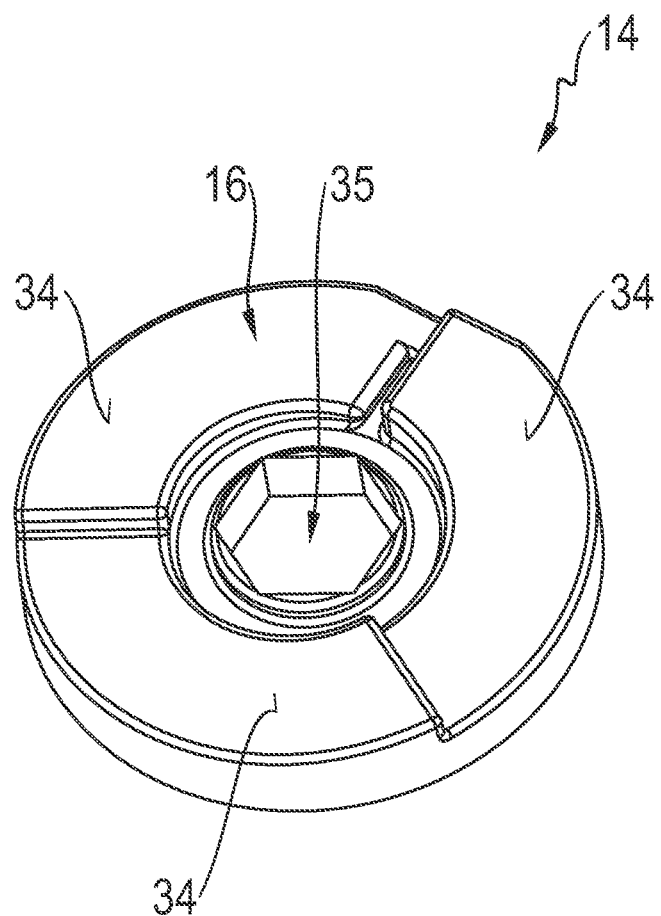
FIG. 7 shows a perspective side view of an adjusting disc for the apparatus according to the disclosure as per FIG. 1.

FIG. 7 shows a perspective side view of the adjusting disc 14 for the apparatus 1 according to the invention as per FIG. 1. The first bearing face 16 of the adjusting disc 14 can be clearly seen. Correspondingly to the second bearing face 17 as per FIG. 6, the first bearing face 16 likewise has multiple inclined faces 34. Since the inclined faces 34 of the adjusting disc 14 have a corresponding form to the inclined faces 33 of the second bearing face 17, in this exemplary arrangement the adjusting disc 14 overall has three inclined faces 34. The inclined faces 34 likewise have a circular arc segment-like form and have a respective identical slope in the same direction of rotation about the centre longitudinal axis 12, which is not illustrated in more detail here.

The adjusting disc 14 additionally has a through-opening 35 for passing through the clamping pin 11, which is not illustrated in more detail here, in a form-fitting manner.

Figure 8:
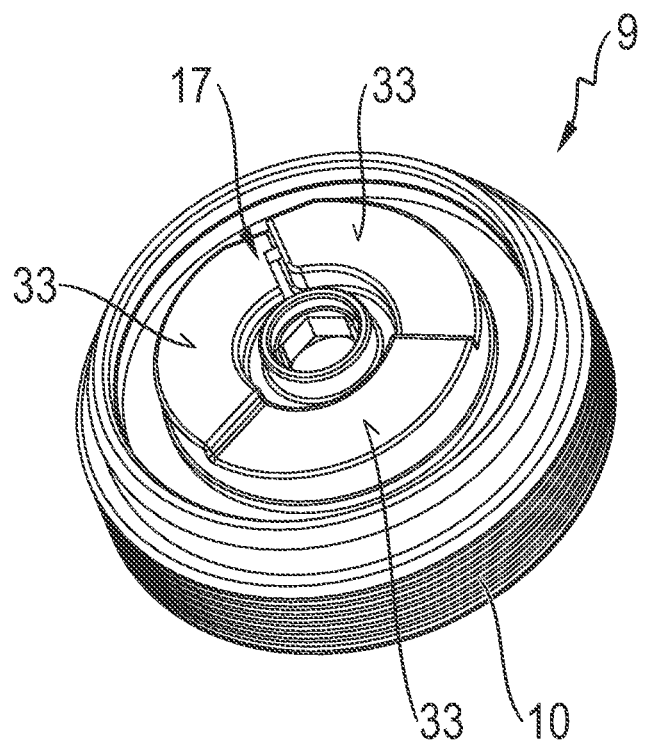
FIG. 8 shows a perspective side view of a bearing element for a further apparatus according to the disclosure.

FIG. 8 shows a perspective side view of the bearing element 9 for a further apparatus according to the disclosure, which is not illustrated in more detail here. It can be clearly seen that, in this exemplary arrangement, the bearing element 9 has the second bearing face 17 with the inclined faces 33. The inclined faces 33 again respectively have a circular arc segment-like form, all of the inclined faces 33 having a respective identical slope in the same direction of rotation about the centre longitudinal axis 12.

The structure and functioning of the apparatus, which is not illustrated in more detail here, substantially correspond to the apparatus 1. By contrast to the apparatus 1, in the case of the further apparatus, however, the pressure piece 2 does not have the second bearing face 17, but rather the bearing element 9 has the second bearing face 17. In this respect, the second bearing face 17 is formed on a side, facing the pressure piece 2, of the bearing element 9. In a mounted state, which is not illustrated in more detail here, a side, facing away from the bearing element 9, of the adjusting disc 14 thus bears against the pressure piece 2. The first bearing face 16 of the adjusting disc 14 faces the second bearing face 17, the two bearing faces 16, 17 bearing against one another in a mounted state.

The invention claimed is:

1. An apparatus for pressing a toothed rack against a pinion, having a pressure piece, wherein the pressure piece can be arranged so as to be displaceable inside a housing and in an axial direction of a centre longitudinal axis, comprising a bearing element that can be fixed on the housing in an axial direction with respect to the centre longitudinal axis, having a prestressing element that acts in an axial direction, wherein, the pressure piece is subjected to a prestressing force in an axial direction with respect to the centre longitudinal axis and directed away from the bearing element, by the prestressing element arrangement between the bearing element and the pressure piece and the pressure piece having a sliding element, wherein the sliding element is arranged on a side, facing away from the prestressing element, of the pressure piece for the purpose of bearing against the toothed rack, wherein, on the side bearing against the sliding element, the pressure piece has a contour for compensating tolerances, wherein the contour interacts with the sliding element.

2. The apparatus according to claim 1, wherein, owing to the contour, the sliding element is elastically deformed and/or is under a prestress in an axial direction of the centre longitudinal axis in a mounted state, and wherein, the contour is at least partially filled with at least one portion, that is elastically deformed into the contour, of the sliding element.

3. The apparatus of claim 2, wherein at least one portion of the sliding element is elastically pressed into the contour in the mounted state.

4. The apparatus according to claim 1 wherein the contour is formed by at least one depression in that side of the pressure piece that bears against the sliding element.

5. The apparatus according to claim 4, wherein the contour has multiple depressions.

6. The apparatus according to claim 4 wherein the depression has a continuously changing depth between two edge regions of the depression.

7. The apparatus according to claim 6, wherein the depression has a first depth in the region of a first edge region and a second depth in the region of a second edge region, the depth continuously decreasing from the first edge region to the second edge region.

8. The apparatus according to claim 7, wherein the depression has a maximum depth of less than 1 mm or less than 0.5 mm or less than 0.2 mm.

9. The apparatus according to claim 4 wherein the at least one depression is in a form of a groove.

10. The apparatus according to claim 4, wherein the at least one depression extends parallel to the longitudinal axis of the toothed rack.

11. The apparatus according to claim 4, wherein the contour has two depressions which extend parallel to one another and in an axial direction of the toothed rack.

12. The apparatus according to claim 11, wherein a respective depression is arranged in a first angle range of +25° to +50° and in a second angle range of −25° to −50° with respect to the centre longitudinal axis and proceeding from a centre point of the toothed rack.

13. The apparatus according to claim 1, wherein the sliding element has a multi-layered, form, wherein the multiple material layers of the sliding element are arranged one on top of another radially with respect to the longitudinal axis of the toothed rack.

14. The apparatus according to claim 13, wherein a material layer facing the pressure piece is made from spring steel and a material layer facing the toothed rack is made from a plastic.

15. The apparatus according to claim 1, wherein an adjusting device, which has an adjusting disc arranged between the bearing element and the pressure piece, wherein the adjusting disc is prestressed and/or rotatably mounted about the centre longitudinal axis by a torsion spring, the adjusting disc has a first bearing face with at least one inclined face, which bears against a second bearing face with at least one inclined face, wherein the second bearing face is in the form of a one-piece constituent part of the pressure piece or of the bearing element.

16. The apparatus according to claim 15, wherein the pressure piece has the second bearing face on a side facing away from the toothed rack-, and a side, facing away from the second bearing face, of the adjusting disc bears against the bearing element.

17. The apparatus according to claim 15, wherein the bearing element has the second bearing face on a side facing the pressure piece, and a side, facing away from the bearing element, of the adjusting disc bears against the pressure piece.

* * * * *